United States Patent [19]
Mandel et al.

[11] Patent Number: 5,971,408
[45] Date of Patent: Oct. 26, 1999

[54] VERTICALLY ADJUSTABLE WHEEL ASSEMBLY

[75] Inventors: Sheldon W. Mandel, East Galesburg, Ill.; Douglas A. Heims, Cedar Rapids, Iowa

[73] Assignee: Maytag Corporation, Newton, Iowa

[21] Appl. No.: 08/869,007

[22] Filed: Jun. 4, 1997

[51] Int. Cl.⁶ .......................... F16M 11/00; A47B 91/00
[52] U.S. Cl. ................. 280/43.2; 248/188.4; 312/249.8; 312/401
[58] Field of Search ..................... 16/19, 32, 34; 248/188.2, 188.4; 312/249.8; 280/43.2, 43.17

[56] References Cited

U.S. PATENT DOCUMENTS

| | | | |
|---|---|---|---|
| 103,782 | 5/1870 | Sargent | 16/19 |
| 1,429,383 | 9/1922 | Warner | 16/19 |
| 1,835,144 | 12/1931 | Cleaveland . | |
| 1,882,464 | 10/1932 | White . | |
| 2,803,510 | 8/1957 | Carbary . | |
| 2,853,732 | 9/1958 | Matter | 16/19 |
| 2,879,075 | 3/1959 | Wallace | 16/19 |
| 3,040,391 | 6/1962 | Saunders . | |
| 3,186,670 | 6/1965 | Perl . | |
| 3,386,208 | 6/1968 | Banner . | |
| 3,432,878 | 3/1969 | Hupfer . | |
| 3,534,430 | 10/1970 | Kesling et al. | 16/19 |
| 3,670,357 | 6/1972 | Steigerwald . | |
| 3,716,890 | 2/1973 | Benson . | |
| 3,750,989 | 8/1973 | Bergeson . | |
| 3,844,578 | 10/1974 | Matyskella et al. | 16/19 |
| 3,858,270 | 1/1975 | Crowe | 16/19 |
| 3,968,949 | 7/1976 | Romano, Jr. | 248/188.4 |
| 4,748,715 | 6/1988 | Rice | 16/19 |
| 4,783,879 | 11/1988 | Weaver | 16/34 |
| 4,789,121 | 12/1988 | Gidseg et al. | 248/188.4 |
| 4,932,729 | 6/1990 | Thompson et al. | 16/19 |
| 4,955,569 | 9/1990 | Hottmann | 248/188.4 |
| 5,347,680 | 9/1994 | Rippe | 16/19 |
| 5,749,550 | 5/1998 | Jackson | 248/188.4 |

FOREIGN PATENT DOCUMENTS 313771   12/1971   U.S.S.R. .

OTHER PUBLICATIONS

Western Electric Technica Digest No. 40; Oct. 1975 pp. 25–26; "Low Profile Caster", classified in 16/19.

*Primary Examiner*—Chuck Y. Mah
*Assistant Examiner*—Donald M. Gurley
*Attorney, Agent, or Firm*—Everett G. Diederiks, Jr.

[57] ABSTRACT

A vertically adjustable wheel assembly for movably supporting an appliance cabinet or the like upon a supporting surface includes a housing, a supporting bracket, a wheel unit, an adjusting rod, an adjusting screw and various elongated mounting members. The wheel unit is defined by a pair of spaced rollers that are interconnected by a reduced diametric portion. The wheel unit is rotatably attached to the support bracket by an axle member, while the adjusting rod is also mounted for rotary movement by the support bracket. The support bracket is pivotally mounted to the housing, with both the wheel unit and the adjusting rod being permitted to rotate relative thereto. The adjusting screw extends through a frontal portion of the housing and it is threadably connected to the adjusting rod such that rotation of the screw causes pivoting of the support bracket relative to the housing and movement of the wheel assembly between fully extended and fully retracted positions. With the rollers of the wheel unit being laterally spaced, the adjusting screw is permitted to extend between the rollers when the adjustable wheel assembly assumes the retracted position. The arrangement represents an extremely compact vertically adjustable wheel assembly that can be advantageously preassembled and attached to a refrigerator cabinet or the like as a unit.

20 Claims, 3 Drawing Sheets

U.S. Patent    Oct. 26, 1999    Sheet 1 of 3    5,971,408

VERTICALLY ADJUSTABLE WHEEL ASSEMBLY

BACKGROUND OF THE INVENTION

1. Field of the Invention

The present invention relates to a vertically adjustable wheel assembly and, more particularly, to a wheel assembly adapted to support an appliance cabinet, such as a refrigerator or the like, upon a supporting surface.

2. Discussion of the Prior Art

In various environments, it is often desirable to mount cabinets or other objects upon wheel assemblies such that the objects can be easily moved about a supporting surface. When the objects are quite heavy and/or when they have to be maneuvered into rather confined spaces, providing such wheel assemblies is particularly advantageous. In the art of household appliances, it has become a customary practice to equip heavy domestic appliances with wheel assemblies to enhance the mobility is of the appliances. When provided with supporting wheel assemblies, even a heavy household appliance, such as a refrigerator, can be readily moved by a single person for installation, repair, cleaning and other purposes.

Often times, it is also desirable to permit some degree of vertical adjustability between the cabinet or other object and the supporting surface. While the majority of household appliances are generally positioned upon surfaces which are relatively level, it has still been found beneficiary to provide some vertical adjustability of the wheel assemblies to ensure precise leveling of the appliances. This is particularly advantageous when applied to a typical refrigerator such that the front portion of the refrigerator can be slightly elevated so ensure that the doors will open and close as desired.

Many vertically adjustable wheel assemblies have been proposed and are currently in use in today's marketplace. As indicated above, it is even somewhat common to apply such adjustable wheel assemblies to household appliances, including refrigerators. Of course, when considering the use of an adjustable wheel assembly to an appliance cabinet, it is important that the application of the wheel assembly does not minimize the available internal useable volume of the appliance and, therefore, the adjustable wheel assembly should be as compact as possible. Of course, the adjustable wheel assembly must also be able to withstand the various loads placed thereon. Furthermore, consideration should be given to the ease of which the adjustable wheel assembly can be attached to the appliance cabinet, as the ability to readily incorporate the attachment of such wheel assemblies in the manufacturing of the appliance will have a hand in determining the viability of the overall arrangement. To date, prior art adjustable wheel assemblies known in the art simply fail to meet these desired objectives.

Therefore, there exists a need in the art for a vertically adjustable wheel assembly particularly adapted for movably supporting an appliance cabinet upon a supporting surface which will enable the internal useable volume of the refrigerator to be maximized, enhance an efficient attachment of the adjustable wheel assembly to the cabinet and provide for a sufficient amount of vertical adjustability, while exhibiting an extremely compact design.

SUMMARY OF THE INVENTION

A vertically adjustable wheel assembly particularly adapted for use in movably supporting an appliance cabinet upon a supporting surface in accordance with the present invention is defined by a compact assembly of parts that can be readily attached to a cabinet or the like as a unit. More specifically, the vertically adjustable wheel assembly is formed from a housing including an upper plate and preferably three downwardly extending side plates to which is pivotally supported a bracket formed from a pair of spaced mounting legs that are interconnected by a bridge member. The supporting bracket defines first, second and third corner portions, with the bracket being pivotally attached to the housing at one of these corner portions. A wheel unit, including a pair of spaced roller members that define a lateral gap therebetween, are rotatably mounted through an axle member to the support bracket at a second corner portion of the mounting legs. An adjusting rod is rotatably mounted at the third corner portions of the mounting legs and the rod has a central portion provided with a threaded bore. An adjusting screw extends through a frontal side plate of the housing and is threadably mated with the bore of the adjusting rod.

With this arrangement, rotation of the adjusting screw causes pivoting of the support bracket relative to the housing that results in vertical movement of the wheel assembly between fully extended and fully retracted positions. In order to increase the compactness of the adjustable wheel assembly and enhance its ability to carry heavy loads, the axle for the wheel assembly is always positioned closer to the frontal side plate than the pivoting axis of the support bracket to the housing. In addition, the wheel unit is preferably integrally molded to include the spaced roller members and an intermediate, reduced diametric portion. When the wheel assembly is retracted, a shaft portion of the adjusting screw extends between the roller members. The support bracket is also formed with stops which are adapted to abut the upper plate of the housing at the fully extended position of the wheel assembly.

With this construction, the vertically adjustable wheel assembly can be completely pre-assembled and simply attached to a refrigerator cabinet or the like either during or after complete assembly of the cabinet. Spacing the rollers and enabling the adjusting screw to extend between the rollers when the wheel assembly is retracted greatly enhances the compactness of the overall assembly while increasing its ability to withstand substantial loads. In addition, with this construction, the adjustable wheel assembly of the present invention enables all forces associated with carrying the weight load and adjusting the wheel height to remain internal to the overall assembly.

Additional objects, features and advantages of the present invention will become more readily apparent from the following detailed description of the preferred embodiment thereof when taken in conjunction with the drawings wherein like reference numerals refer to corresponding parts in the several views.

DETAILED DESCRIPTION OF THE PREFERRED EMBODIMENT

Figure 1:
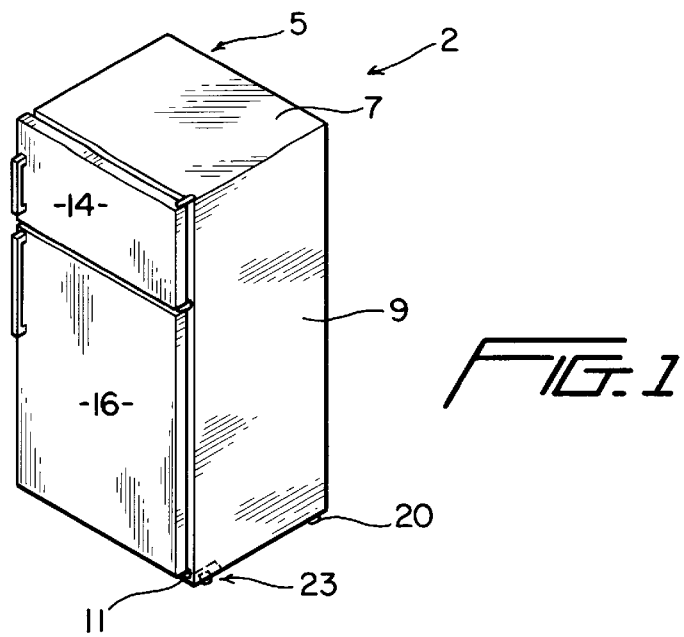
FIG. 1 is a perspective view of a household refrigerator incorporating the vertically adjustable wheel assembly of the present invention.

With initial reference to FIG. 1, a top-mount style refrigerator is generally indicated at 2. Refrigerator 2 includes an outer cabinet shell 5 that is generally formed of sheet metal which is bent to define a top panel 7 and side panels, one of which is indicated at 9. Top and side panels 9 are generally interconnected at a lower portion thereof by a face plate 11, as well as a mullion bar and a rear panel (not shown). As is well known in the art, this style of a refrigerator is provided with an upper freezer compartment door 14 and a lower fresh food compartment door 16. The right side of refrigerator 2 is shown to include a rear wheel unit 20 and a vertically adjustable front wheel assembly 23 that is constructed in accordance with the present invention. Of course, a similar arrangement is provided on the left side of refrigerator 2.

Figure 2:
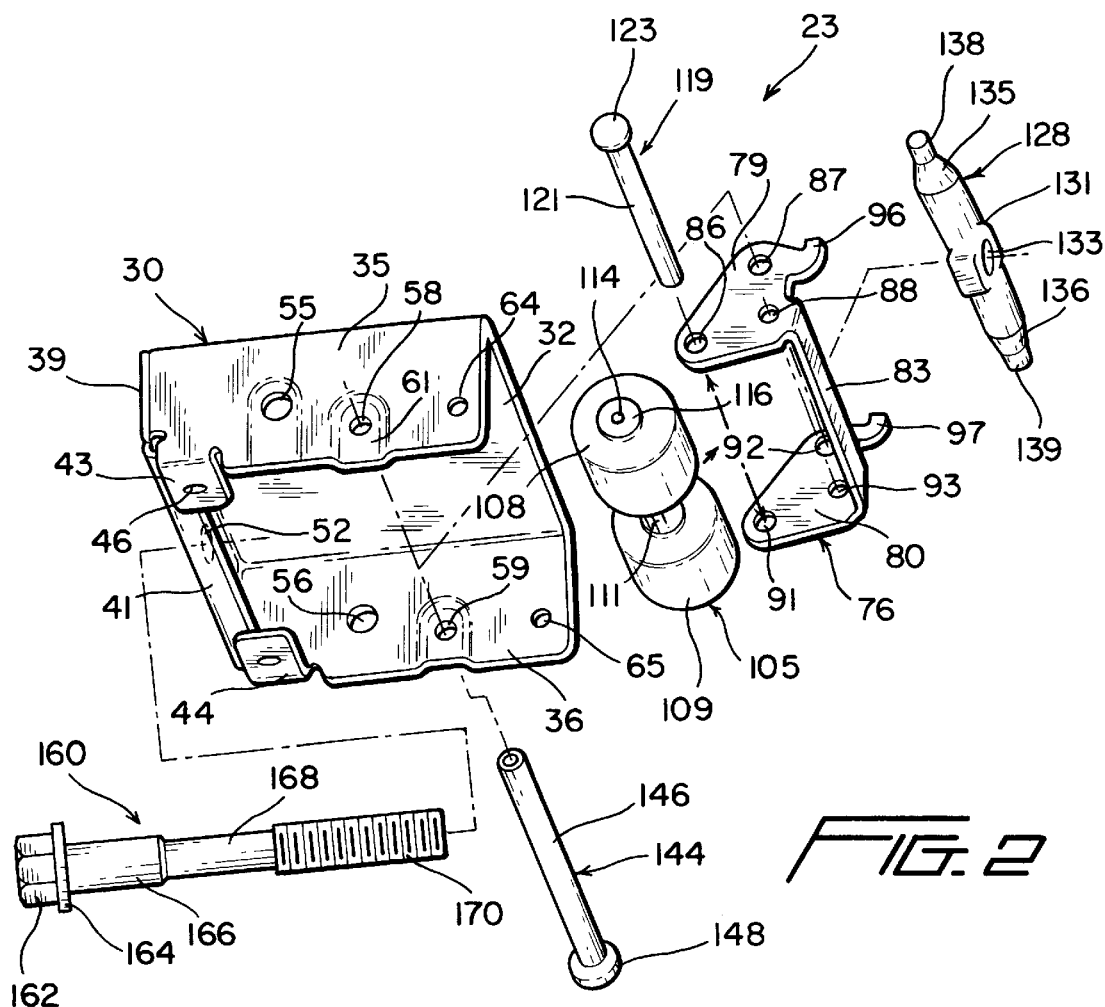
FIG. 2 is an exploded perspective view of the adjustable wheel assembly of the invention.

Reference will now be made to FIG. 2 in describing the components combining to form vertically adjustable wheel assembly 23. As depicted, adjustable wheel assembly 23 includes a housing 30 having an upper plate 32, a pair of lateral side plates 35 and 36 and a frontal side plate 39. In the preferred embodiment, housing 30 is formed of metal. Frontal side plate 39 includes an in-turned lower edge 41 over which is bent a pair of in-turned lower flanges 43 and 44 provided at lower frontal edge portions of lateral side plates 35 and 36. Each in-turned lower flange 43, 44 is provided with an opening 46. Frontal side plate 39 is formed with a central through hole 52. Lateral side plates 35 and 36 are provided with a forward set of aligned tooling holes 55 and 56, an intermediate set of aligned holes 58 and 59 which are located within respective recessed areas 61, and a rear set of aligned holes 64 and 65. Although not shown, additional spaced holes can be provided in upper plate 32 for the reason will become apparent below.

Indicated at 76 is a support bracket that is also preferably formed of metal and includes a pair of generally triangular-shaped mounting legs 79 and 80 which are interconnected by a laterally extending bridge member 83. Although the particular shape of mounting legs 79 and 80 are not critical in accordance with the invention, mounting leg 79 is provided with first, second and third apertures 86–88 which are spaced in a generally triangular pattern. Given that mounting leg 79 is triangular-shaped in the preferred embodiment shown, apertures 86–88 are generally provided at corner portions of mounting leg 79. In a similar manner, mounting leg 80 is provided with first, second and third apertures 91–93. As clearly shown, apertures 86 and 91, apertures 87 and 92 and apertures 88 and 93 are respectively, axially aligned with one another so that they generally define first, second and third sets of axially aligned apertures. The reason for arranging apertures 86–88 and 90–91 in this fashion will become more fully apparent below. In the preferred embodiment, each of the mounting legs 79 and 80 of support bracket 76 is also formed with an extension member 96 and 97 respectively. As will be detailed more fully below, extension members 96 and 97 function as stops when adjustable wheel assembly 23 reaches a fully extended position.

Adjustable wheel assembly 23 further includes a wheel unit 105 which, in the preferred embodiment, includes a pair of spaced rollers 108 and 109 that are interconnected by a reduced diametric portion 111. Wheel unit 105 is preferably integrally formed of plastic, but could also be formed of other materials including hardened rubber. Wheel unit 105 is provided with a central through bore 114 that defines a central axis of wheel unit 105. Each of the outer sides of rollers 108 and 109 are preferably formed with a raised end portion, such as that shown at 116, which extends about central through bore 114 and generally acts as a bearing element. Wheel unit 105 is rotatably attached to support bracket 76 by means of an axle member 119 having a shaft 121 that extends through the first aperture 86 of mounting leg 79, central through bore 114 of wheel unit 105 and first aperture 91 of mounting leg 80. Axle member 119 also includes a head 123 which is adapted to abut mounting leg 79 to limit its travel.

Adjustable wheel assembly 23 further includes an adjusting rod 128 having a central portion 131 that is provided with a threaded bore 133. Adjusting rod 128 further includes tapering sections 135 and 136 that lead from central portion 131 to a pair of terminal ends 138 and 139. Adjusting rod 128 is also adapted to be rotatably mounted to support bracket 76 with terminal end 138 projecting through aperture 87 of mounting leg 79 and terminal end 139 projecting through aperture 92 of mounting leg 80. Due to the length of adjusting rod 128, mounting legs 79 and 80 are initially angled outwardly to permit ready insertion of adjusting rod 128 between mounting legs 79 and 80 and then mounting legs 79 and 80 are shifted to capture adjusting rod 128. As will be discussed more fully below, once adjustable wheel assembly 32 is fully assembled, adjusting rod 128 is prevented from shifting out of apertures 87 and 92.

Once wheel unit 105 and adjusting rod 128 are attached to support bracket 76, support bracket 76 is positioned between lateral side plates 35 and 36 of housing 30 with wheel unit 105 extending toward frontal side plate 39. A pin 144 is then utilized to pivotally mount support bracket 76 to housing 30. More specifically, pin 144 includes a shaft 146 that extends through intermediate hole 59, third aperture 93 of mounting leg 80, third aperture 88 of mounting leg 79 and then intermediate hole 58 of lateral side plate 35. Pin 144 also includes a head 148 that is adapted to be received within the recessed area 61 of lateral side plate 36. The opposing end of pin 144 is internally bored which enables pin 144 to be readily flared to positively retain supporting bracket 76 within housing 30. In this manner, pin 144 generally acts as an elongated rivet and defines an axis about which support bracket 76 can pivot relative to housing 30. Of course, other mounting arrangements including providing pin 144 with a threaded end and securing a nut thereto could be employed within the scope of the invention. Although not mentioned above, a similar variety of attachment methods could be employed in connection with axle member 119.

Finally, adjustable wheel assembly 23 includes an adjusting screw 160 which, in the preferred embodiment shown, includes a head 162 having an integral washer portion 164, a first shaft section 166, a second, reduced diametric shaft section 168 and a threaded shaft section 170. Adjusting screw 160 is adapted to extend within housing 30 with threaded shaft section 170 initially extending into through hole 52 and then being threadably received within threaded bore 133 of adjusting rod 128. Given the construction of wheel unit 105, the longitudinal axis of adjusting screw 160 extends between rollers 108 and 109, i.e., above reduced diametric portion 111.

Figure 3:
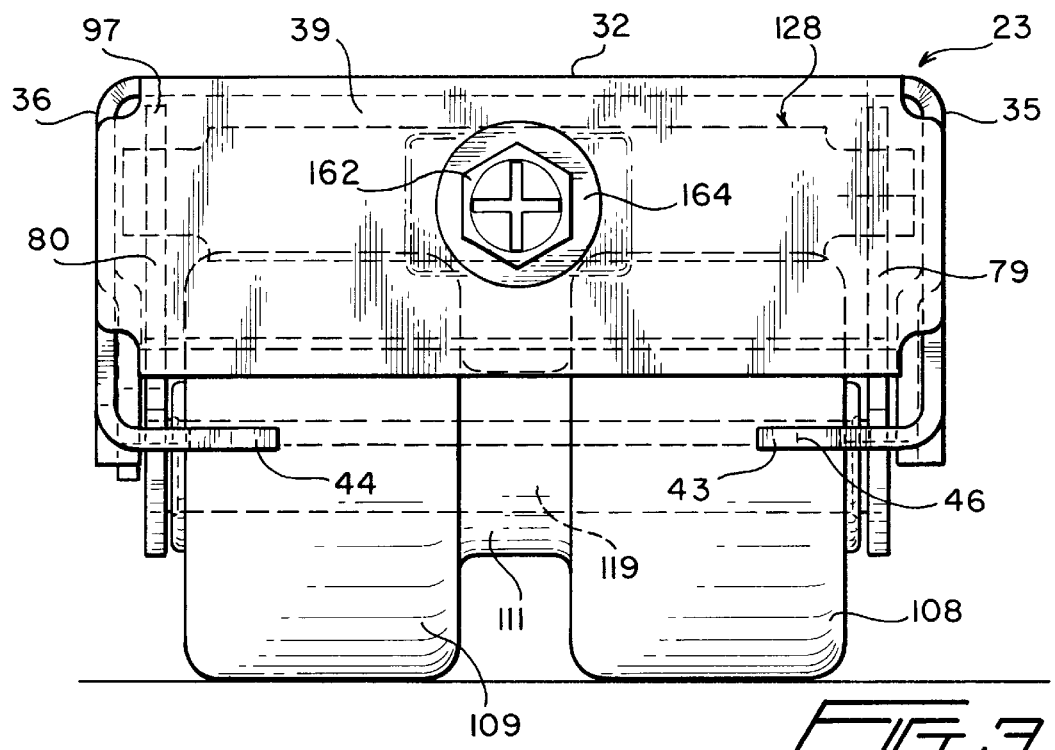
FIG. 3 is a schematic front view of the adjustable wheel assembly.
Figure 4:
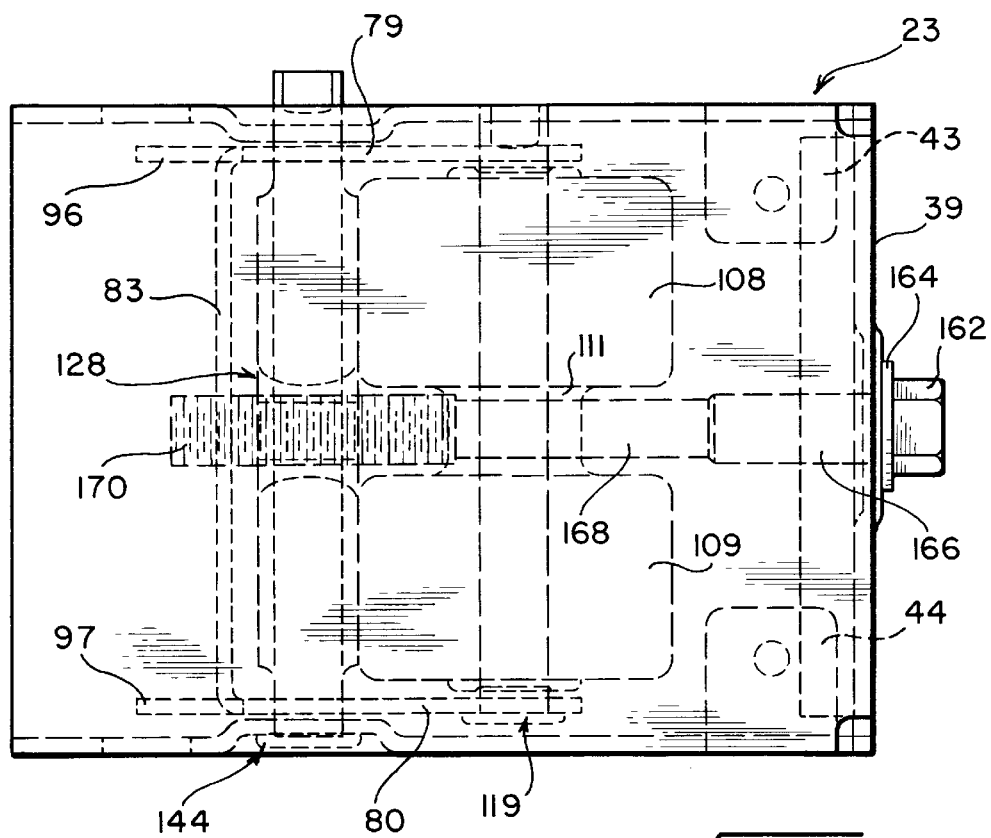
FIG. 4 is a schematic top view of the adjustable wheel assembly.

The fully assembled state of adjustable wheel assembly 23 can be best understood from viewing FIGS. 3–6. However, it should be noted that FIG. 4 does not illustrate the flaring of axle member 119 or pin 144 such that the internal construction of these components can be illustrated. Of these figures, FIG. 3 is initially referenced to point out the manner in which the terminal ends 138 and 139 of adjusting rod 128 are arranged relative to mounting legs 79 and 80, as well as lateral side plates 35 and 36. Given the available space between terminal ends 138 and 139 in lateral side plates 35 and 36, it should be realized that adjusting rod 128 is captures by lateral side plates 35 and 36 and prevented from coming out of support bracket 76. As also clearly shown in this figure, head 162 of adjusting screw 160 is adapted to receive various conventional tools, including screwdrivers, wrenches and socket members, for rotating adjusting screw 160. Of course, rotation of adjusting screw 160 causes pivoting of support bracket 76 relative to housing 30 and vertical movement of the adjustable wheel assembly 23 between fully extended and fully retracted positions.

Figure 5:
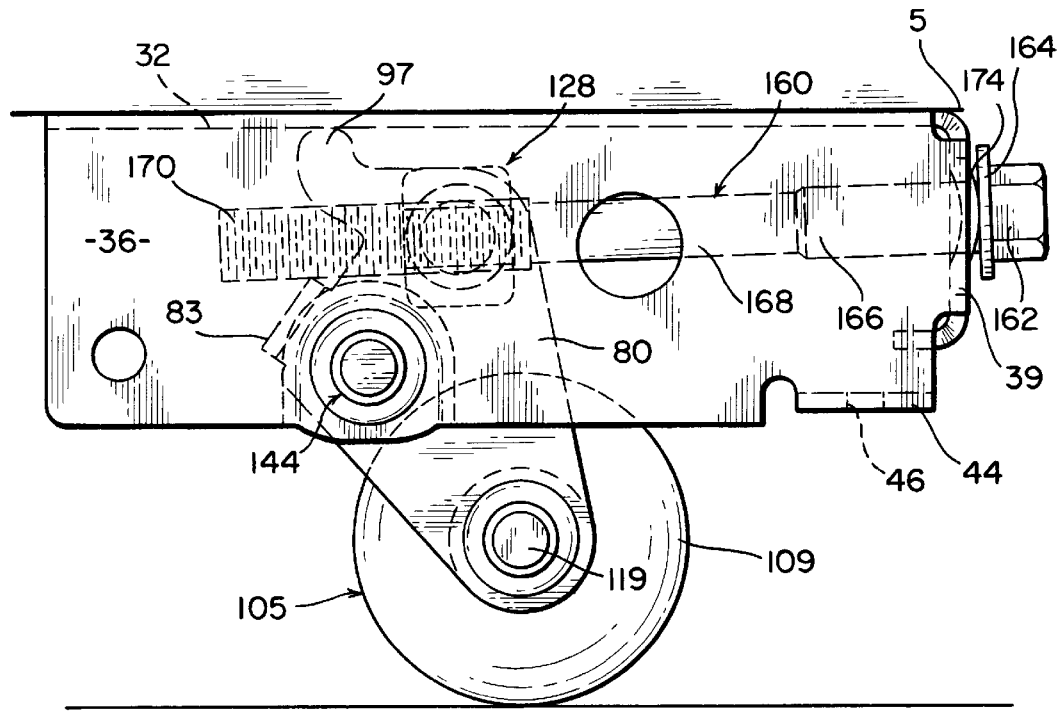
FIG. 5 is a schematic side view of the adjustable wheel assembly shown in a fully extended position.
Figure 6:
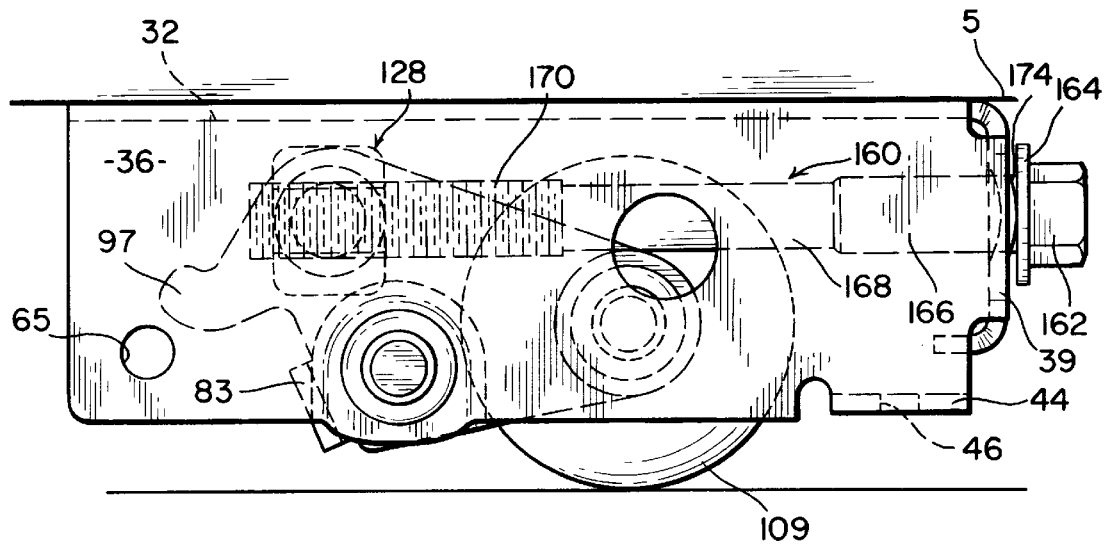
FIG. 6 is a schematic side view of the adjustable wheel assembly shown in a fully retracted position.

More specifically, FIG. 5 illustrates adjustable wheel assembly 33 in a fully extended position wherein adjusting rod 128 assumes a position located closer to frontal side plate 39 than pin 144 and wheel unit 105 is spaced a substantial distance from upper plate 32 of housing 30. On the other hand, FIG. 6 illustrates adjustable wheel assembly 23 in the fully retracted position wherein adjusting rod 128 is located further from frontal side plate 39 than pin 144. However, in either of the extended or retracted positions, axle member 119 is always located closer to frontal side plate 39 than pin 144 and wheel unit 105 is generally maintained in a central portion of housing 30. Due to the spacing of rollers 108 and 109, adjusting screw 160 can extend between rollers 108 and 109 when adjustable wheel assembly 103 is retracted. With this design, when fully retracted, second shaft section 168 of adjusting screw 160 can abut reduced diametric portion of 111 of wheel unit 105 as clearly shown in FIG. 6. Within the invention, it is also possible to provide threaded shaft section 170 of adjusting screw 160 with an intermediate, non-threaded portion (not shown) which would limit the outward travel of adjusting screw 160 within threaded bore 133 to the position shown in FIG. 6. Conversely, when adjustable wheel assembly 23 is fully extended, extensions 96 and 97 of mounting legs 79 and 80 abut upper plate 32 as illustrated in FIG. 5. Of course, adjusting screw 160 must also shift relative to housing 30 when adjusting the wheel assembly 23. To accommodate this movement and to prevent any binding of the assembly, frontal side plate 39 is formed with an outwardly curved portion 174 which is engaged by washer portion 164 of adjusting screw 160, as clearly shown in FIGS. 5 and 6, to enable rocking of adjusting screw 160.

When applied to top mount refrigerator 2, adjustable wheel assembly 23 is preferably attached with frontal side plate 39 being secured to face plate 11 with face plate 11 being formed with an enlarged opening to permit access to head 162. More specifically, face plate 11 extends beneath housing 30 and sheet metal screws are received in openings 46 to interconnect housing 30 and face plate 11. Housing 30 can be additionally attached to a conventional panel foam leg (not shown) at holes 64 and 65. Of course, adjustable wheel assembly 23 can be applied to various types of cabinets or the like, and can be mounted in various fashions including welding and bolting. When applied to a side-by-side refrigerator, housing 30 is preferably mounted to a lower horizontal reinforcing frame typically provided on such a unit through the use of the holes provided in upper plate 32 as mentioned above. In any event, it should be readily apparent that the adjustable wheel assembly 23 of the present invention provides an extremely compact arrangement, while still providing a substantial amount of vertical adjustability. In addition, the adjustable wheel assembly 23 can be advantageously pre-assembled and then interconnected to a cabinet or the like of a unit.

Although described with respect to a preferred embodiment of the invention, it should be readily understood that various changes and/or modifications can be made to the invention without departing from the spirit thereof. In addition, it should be noted that terms such as "top", "frontal", "upper" and the like are merely presented for reference purposes to aid in the understanding of the embodiment illustrated in the drawings. Therefore, these terms are not intended to be limiting in any other sense. In general, the invention is only intended to be limited by the scope of the following claims.

We claim:

1. In an appliance including a cabinet having front corner portions and rear corner portions, a vertically adjustable wheel assembly for movably supporting the appliance upon a supporting surface comprising:

a compact housing including an upper plate and at least three side plates extending downward from a frontal portion and opposing lateral side portions of the upper plate respectively with the lateral side plates being formed with a set of axially aligned holes and the frontal side plate being formed with a through hole;

a support bracket including a pair of spaced mounting legs and a bridge member interconnecting the mounting legs, with the mounting legs being formed with first, second and third sets of axially aligned apertures arranged in a triangular pattern;

a wheel unit having an associated central axis;

an axle member mounting the wheel unit to the support bracket for rotation about the central axis, with the axle member connecting the wheel unit at the first set of axially aligned apertures;

an adjusting rod having end portions rotatably mounted within the second set of axially aligned apertures and a central portion provided with a threaded bore;

a pin member pivotally mounting the support bracket within the housing, with the pin member extending through the set of axially aligned holes of the housing and the third set of axially aligned apertures of the support bracket; and an adjusting screw extending through the through hole of the frontal side plate, with the adjusting screw having a head portion positioned at the frontal side plate and a threaded portion received within the threaded bore of the adjusting rod, wherein the housing and the wheel unit are mounted beneath one of the front corner portions of the appliance cabinet with rotation of the adjusting screw from the front corner portion of the appliance cabinet causing pivoting of the support bracket relative to the housing and vertical movement of the adjustable wheel assembly between fully extended and fully retracted positions.

2. The adjustable wheel assembly according to claim 1, further comprising at least one stop member carried by the support bracket, with the at least one stop member abutting the upper plate when the adjustable wheel assembly reaches the fully extended position.

3. The adjustable wheel assembly according to claim 1, wherein the axle member is always positioned closer to the frontal side plate than the pin member.

4. The adjustable wheel assembly according to claim 1, wherein, when the adjustable wheel assembly is in the fully extended position, the adjusting rod is located closer to the frontal side plate than the pin member and, when the adjustable wheel assembly is in the fully retracted position, the pin member is located closer to the frontal side plate than the adjusting rod.

5. A vertically adjustable wheel assembly for movably supporting an appliance cabinet upon a supporting surface comprising:

a housing including an upper plate and at least three side plates extending downward from a frontal portion and opposing lateral side portions of the upper plate respectively with the lateral side plates being formed with a set of axially aligned holes and the frontal side plate being formed with a through hole;

a support bracket including a pair of spaced mounting legs and a bridge member interconnecting the mounting legs, with the mounting legs being formed with first, second and third sets of axially aligned apertures arranged in a triangular pattern;

a wheel unit having an associated central axis, wherein the wheel unit includes a pair of spaced, supporting surface engaging roller members defining a lateral gap therebetween;

an axle member mounting the wheel unit to the support bracket for rotation about the central axis, with the axle member connecting the wheel unit at the first set of axially aligned apertures;

an adjusting rod having end portions rotatably mounted within the second set of axially aligned apertures and a central portion provided with a threaded bore;

a pin member pivotally mounting the support bracket within the housing, with the pin member extending through the set of axially aligned holes of the housing and the third set of axially aligned apertures of the support bracket; and an adjusting screw extending through the through hole of the frontal side plate, with the adjusting screw having a head portion abutting the frontal side plate and a threaded portion received within the threaded bore of the adjusting rod, wherein rotation of the adjusting screw causes pivoting of the support bracket relative to the housing and vertical movement of the adjustable wheel assembly between fully extended and fully retracted positions, wherein the adjusting screw extends through the lateral gap, at least when the adjustable wheel assembly assumes the fully retracted position.

6. The adjustable wheel assembly according to claim 5, wherein the roller members are laterally interconnected by a reduced diametric portion of the wheel unit.

7. The adjustable wheel assembly according to claim 6, wherein the adjusting screw abuts the reduced diametric portion when the adjustable wheel assembly reaches the fully retracted position.

8. The adjustable wheel assembly according to claim 6, wherein the wheel unit constitutes an integrally molded member.

9. A vertically adjustable wheel assembly for movably supporting an appliance cabinet upon a supporting surface comprising:

a compact housing including an upper plate and at least three side plates extending downward from a frontal portion and opposing lateral side portions of the upper plate respectively with the lateral side plates being formed with a set of axially aligned holes and the frontal side plate being formed with a through hole, wherein the housing further includes at least one in-turned flange that is arranged vertically below and extends generally parallel to the upper plate, with the in-turned flange including a threaded opening adapted to receive a vertically adjustable leg leveler;

a support bracket including a pair of spaced mounting legs and a bridge member interconnecting the mounting legs, with the mounting legs being formed with first, second and third sets of axially aligned apertures arranged in a triangular pattern;

a wheel unit having an associated central axis;

an axle member mounting the wheel unit to the support bracket for rotation about the central axis, with the axle member connecting the wheel unit at the first set of axially aligned apertures;

an adjusting rod having end portions rotatably mounted within the second set of axially aligned apertures and a central portion provided with a threaded bore;

a pin member pivotally mounting the support bracket within the housing, with the pin member extending through the set of axially aligned holes of the housing and the third set of axially aligned apertures of the support bracket; and an adjusting screw extending through the through hole of the frontal side plate, with the adjusting screw having a head portion positioned at the frontal side plate and a threaded portion received within the threaded bore of the adjusting rod, wherein the housing and the wheel unit are adapted to be mounted beneath one end portion of an appliance cabinet with rotation of the adjusting screw from the one end portion of the appliance cabinet causing pivoting of the support bracket relative to the housing and vertical movement of the adjustable wheel assembly between fully extended and fully retracted positions.

10. A vertically adjustable wheel assembly for movably supporting an appliance cabinet upon a supporting surface comprising:

a housing including interconnected frontal and lateral side plates with the frontal side plate being formed with a hole;

a support bracket including a pair of spaced, generally parallel arranged mounting legs and a bridge member interconnecting the mounting legs, each of the mounting legs defining at least first, second and third corner portions, with the bridge member being located closer to the third corner portions than the second corner portions;

a wheel unit having an associated central axis;

an adjusting member provided with an internally threaded bore;

means for mounting the wheel unit, for rotation about the central axis, to the support bracket at the first corner portion of each of the mounting legs;

means for rotatably mounting the adjusting member to the support bracket at the second corner portion of each of the mounting legs;

means for pivotally mounting the support bracket to the lateral side plates at the third corner portions; and an adjusting screw extending through the through hole of the frontal side plate, with the adjusting screw having a head portion positioned at the frontal side plate and a threaded portion received within the threaded bore of the adjusting rod, wherein rotation of the adjusting screw causes pivoting of the support bracket relative to the housing and vertical movement of the adjustable wheel assembly between fully extended and fully retracted positions, wherein the first corner portions are always positioned closer to the frontal side plate than the third corner portion, and the second corner portions are located closer to the frontal side plate than the third corner portion when the adjustable wheel assembly is in the fully extended position, but further from the frontal side plate when the adjustable wheel assembly is in the fully retracted position.

11. The vertically adjusting wheel assembly according to claim 10, wherein the housing further comprises an upper plate interconnecting the frontal and lateral side plates and the adjustable wheel assembly further comprises at least one stop member carried by the support bracket, with the at least one stop member abutting the upper plate when the adjustable wheel assembly reaches the fully extended position.

12. A vertically adjustable wheel assembly for movably supporting an appliance cabinet upon a supporting surface comprising:
- a housing including interconnected frontal and lateral side plates with the frontal side plate being formed with a hole;
- a support bracket including a pair of spaced, generally parallel arranged mounting legs and a bridge member interconnecting the mounting legs, each of the mounting legs defining at least first, second and third corner portions;
- a wheel unit having an associated central axis, wherein the wheel unit includes a pair of spaced, supporting surface engaging roller members defining a lateral gap therebetween and;
- an adjusting member provided with an internally threaded bore;
- means for mounting the wheel unit, for rotation about the central axis, to the support bracket at the first corner portion of each of the mounting legs;
- means for rotatably mounting the adjusting member to the support bracket at the second corner portion of each of the mounting legs;
- means for pivotally mounting the support bracket to the lateral side plates at the third corner portions; and
- an adjusting screw extending through the through hole of the frontal side plate, with the adjusting screw having a head portion abutting the frontal side plate and a threaded portion received within the threaded bore of the adjusting rod, wherein rotation of the adjusting screw causes pivoting of the support bracket relative to the housing and vertical movement of the adjustable wheel assembly between fully extended and fully retracted positions, wherein the first corner portions are always positioned closer to the frontal side plate than the third corner portions, and the second corner portions are located closer to the frontal side plate than the third corner portions when the adjustable wheel assembly is in the fully extended position, but further from the frontal side plate when the adjustable wheel assembly is in the fully retracted position, and wherein the adjusting screw extends through the lateral gap, at least when the adjustable wheel assembly assumes the fully retracted position.

13. The adjustable wheel assembly according to claim 12, wherein the roller members are laterally interconnected by a reduced diametric portion of the wheel unit.

14. The adjustable wheel assembly according to claim 13, wherein the adjusting screw abuts the reduced diametric portion when the adjustable wheel assembly reaches the fully retracted position.

15. The adjustable wheel assembly according to claim 14, wherein the wheel unit constitutes an integrally molded member.

16. A vertically adjustable wheel assembly for movably supporting an appliance cabinet upon a supporting surface comprising:
- a housing including interconnected frontal and lateral side plates with the frontal side plate being formed with a hole;
- a wheel unit including a pair of spaced, supporting surface engaging roller members defining a lateral gap therebetween, with the roller members having a common central axis;
- a support bracket including a pair of spaced, generally parallel arranged mounting legs and a bridge member interconnecting the mounting legs, each of the mounting legs defining at least first, second and third mounting portions,
- an adjusting member provided with an internally threaded bore;
- means for mounting the wheel unit, for rotation about the central axis, to the support bracket at the first mounting portion of each of the mounting legs;
- means for rotatably mounting the adjusting member to the support bracket at the second mounting portion of each of the mounting legs;
- means for pivotally mounting the support bracket to the lateral side plates at the third mounting portions; and
- an adjusting screw extending through the through hole of the frontal side plate, with the adjusting screw having a head portion abutting the frontal side plate and a threaded portion received within the threaded bore of the adjusting rod, wherein rotation of the adjusting screw causes pivoting of the support bracket relative to the housing and vertical movement of the adjustable wheel assembly between fully extended and fully retracted positions, wherein the adjusting screw extends through the lateral gap between the roller members of the wheel unit, at least when the adjustable wheel assembly assumes the fully retracted position.

17. The adjustable wheel assembly according to claim 16, wherein the wheel unit is formed as an integrally molded member with the roller members being laterally interconnected by a reduced diametric portion of the wheel unit.

18. The adjustable wheel assembly according to claim 17, wherein the adjusting screw abuts the reduced diametric portion when the adjustable wheel assembly reaches the fully retracted position.

19. The adjustable wheel assembly according to claim 16, wherein the first mounting portions are always positioned closer to the frontal side plate than the third mounting portions, and the second mounting portions are located closer to the frontal side plate than the third mounting portions when the adjustable wheel assembly is in the fully extended position, but further from the frontal side plate when the adjustable wheel assembly is in the fully retracted position.

20. The adjustable wheel assembly according to claim 19, wherein the housing further comprises an upper plate interconnecting the frontal and lateral side plates and the adjustable wheel assembly further comprises at least one stop member carried by the support bracket, with the at least one stop member abutting the upper plate when the adjustable wheel assembly reaches the fully extended position.

* * * * *